United States Patent
Yamauchi

(10) Patent No.: US 10,826,337 B2
(45) Date of Patent: Nov. 3, 2020

(54) DIRECT-CURRENT MOTOR AND ACTUATOR

(71) Applicant: Mitsubishi Electric Corporation, Tokyo (JP)

(72) Inventor: Makoto Yamauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 194 days.

(21) Appl. No.: 16/075,060

(22) PCT Filed: Mar. 23, 2016

(86) PCT No.: PCT/JP2016/059192
§ 371 (c)(1),
(2) Date: Aug. 2, 2018

(87) PCT Pub. No.: WO2017/163333
PCT Pub. Date: Sep. 28, 2017

(65) Prior Publication Data
US 2020/0083760 A1 Mar. 12, 2020

(51) Int. Cl.
*H02K 1/04* (2006.01)
*H02K 7/06* (2006.01)
*H02K 7/10* (2006.01)
*H02K 23/04* (2006.01)

(52) U.S. Cl.
CPC .............. *H02K 1/04* (2013.01); *H02K 7/06* (2013.01); *H02K 7/10* (2013.01); *H02K 23/04* (2013.01)

(58) Field of Classification Search
CPC ............ H02K 1/04; H02K 23/04; H02K 7/06; H02K 7/10
See application file for complete search history.

(56) References Cited

U.S. PATENT DOCUMENTS

| | | | | |
|---|---|---|---|---|
| 5,784,922 A | * | 7/1998 | Ozaki | F16H 25/2015 74/89.37 |
| 6,342,744 B1 | * | 1/2002 | Harada | H02K 23/04 310/10 |
| 8,690,122 B2 | * | 4/2014 | Kato | H02K 7/06 123/568.24 |

FOREIGN PATENT DOCUMENTS

| | | |
|---|---|---|
| CN | 201274437 Y | 7/2009 |
| CN | 101507086 A | 8/2009 |
| CN | 205070677 U | 3/2016 |
| JP | 8-98473 A | 4/1996 |

OTHER PUBLICATIONS

International Search Report (PCT/ISA/210) issued in PCT/JP2016/059192, dated Jun. 28, 2016.
Chinese Office Action and Search Report, dated Nov. 29, 2019, for Chinese Application No. 201680083288.0, along with an English translation of the Chinese Office Action.
Chinese Office Action dated Jun. 19, 2020 for Chinese Application No. 201680083288.0, along with an English translation of the Office Action.

* cited by examiner

*Primary Examiner* — Dang D Le

(74) *Attorney, Agent, or Firm* — Birch, Stewart, Kolasch & Birch, LLP.

(57) ABSTRACT

A collar is provided on the outer periphery of a rotor shaft and is integrated with a cylindrical member through apertures penetrating the outer wall of the rotor shaft.

4 Claims, 9 Drawing Sheets

DIRECT-CURRENT MOTOR AND ACTUATOR

TECHNICAL FIELD

The present invention relates to a direct-current (DC) motor including a brush, a commutator, and a rotor provided with electromagnetic coils formed by distributed winding, and an actuator including the motor.

BACKGROUND ART

A typical traditional brushed DC motor includes a bottomed cylindrical stator, magnets disposed on the inner periphery of the stator, a rotor disposed to face the magnets in the circumferential direction, a commutator fixed to a rotor shaft, and brushes in contact with the commutator in the axial direction.

The rotor includes a rotor core which electromagnetic coils are formed around and the rotor shaft penetrating a shaft hole of the rotor core.

The commutator is fixed to the rotor shaft at one end of the rotor core in the axial direction of the rotor core and rotates with the rotor shaft. The commutator includes plural segments disposed at equal intervals in the circumferential direction. The segments are insulated from each other and are connected to the respective windings of electromagnetic coils. In this configuration, if the windings connected to different segments come into contact with the rotor shaft and are electrically connected to the rotor shaft, the segments are mutually short-circuited through the rotor shaft.

A traditional technique that can prevent the electric conduction between the windings of the electromagnetic coils and the rotor shaft is, for example, a structure disclosed in Patent Literature 1. In this structure, a laminated plate serving as a rotor core has an outer periphery covered with an insulating coating layer. The insulating coating layer is integrated with a rotor shaft. In other words, the rotor shaft and the insulating coating layer are formed by the same resin material. Thus, the windings can remain insulated from the rotor shaft even if the windings of the electromagnetic coils come into contact with the rotor shaft.

CITATION LIST

Patent Literature

[PLT 1]
Japanese Patent Application Publication No. Hei 8-98473

SUMMARY OF INVENTION

Technical Problem

Unfortunately, resin rotor shafts often fail to satisfy the requirements for rigidity and heat resistance in applications of DC motors. In contrast, metal rotor shafts generally have higher rigidity and heat resistance than those of resin shafts; hence, DC motors including metal rotor shafts can be used in various applications. However, the electric conduction between the metal rotor shaft and the windings of the electromagnetic coils should be avoided, as described above.

In order to avoid the electric conduction, insulating coating is applied to the rotor shaft or an insulating material, for example, an insulating heat-shrinkable tube is mounted to the rotor shaft.

Since the insulating coating of a rotor shaft can be performed in limited process sequence, the process management is complicated. For example, a rotor shaft to which insulating coating is applied by means of powder coating has a very rough face due to the adhering powder, and thus such rotor shaft cannot be press fitted into the central hole of the rotor core. Other insulating coating approaches may cause detachment of insulating coatings when the rotor shaft is press fitted into the central hole of the rotor core.

Since the insulating coatings provided prior to mount of the rotor shaft to the rotor core may raise troubles in the post-processes, the rotor shaft is mounted to the rotor core and then insulating coating is applied thereto. In this case, both the rotor shaft and the rotor core should be provided and combined with each other prior to the insulating coating process for the rotor shaft, and thus the process sequence is limited.

Meanwhile, in the case where the heat-shrinkable tube is mounted to the rotor shaft, the rotor shaft and the rotor core can be separately insulated. Thus, the process sequence is not limited, and the process management is simple.

However, a new component, i.e., the heat-shrinkable tube is needed, and mount of the heat-shrinkable tube requires complicated work, such as insertion of the rotor shaft into the heat-shrinkable tube and subsequent heating of the heat-shrinkable tube to put the tube into tight contact with the rotor shaft.

An object of the present invention, which solves the above mentioned problems, is to provide a DC motor and an actuator that can be manufactured under simple process management and with simple work and that can properly insulate windings of electromagnetic coils from a rotor shaft.

Solution to Problem

A DC motor according to the present invention includes a rotor, a thread, and an annular collar. The rotor includes a rotor core which is provided with electromagnetic coils formed around the rotor core by distributed winding and a cylindrical rotor shaft combined with the rotor core. The thread is provided on the inner periphery of a cylindrical member which is formed by a resin material inside the rotor shaft, and to convert torque of the rotor into thrust of an output shaft in a linear motion direction of the output shaft. The collar is provided on the outer periphery of the rotor shaft and is integrated with the cylindrical member through an aperture penetrating the outer wall of the rotor shaft.

Advantageous Effects of Invention

In accordance with the present invention, in the process for formation of the cylindrical member inside the rotor shaft the collar is formed integrally. Thus, the DC motor can be manufactured under simple process management and with simple work. The collar formed by a resin material intervenes between the outer periphery of the rotor shaft and the windings of the electromagnetic coils. Thus, the collar can properly insulate the windings of the electromagnetic coils from the rotor shaft.

DESCRIPTION OF EMBODIMENTS

Embodiments of the present invention will now be described for explaining the present invention in more detail with reference to the accompanying drawings.

Embodiment 1

Figure 1:
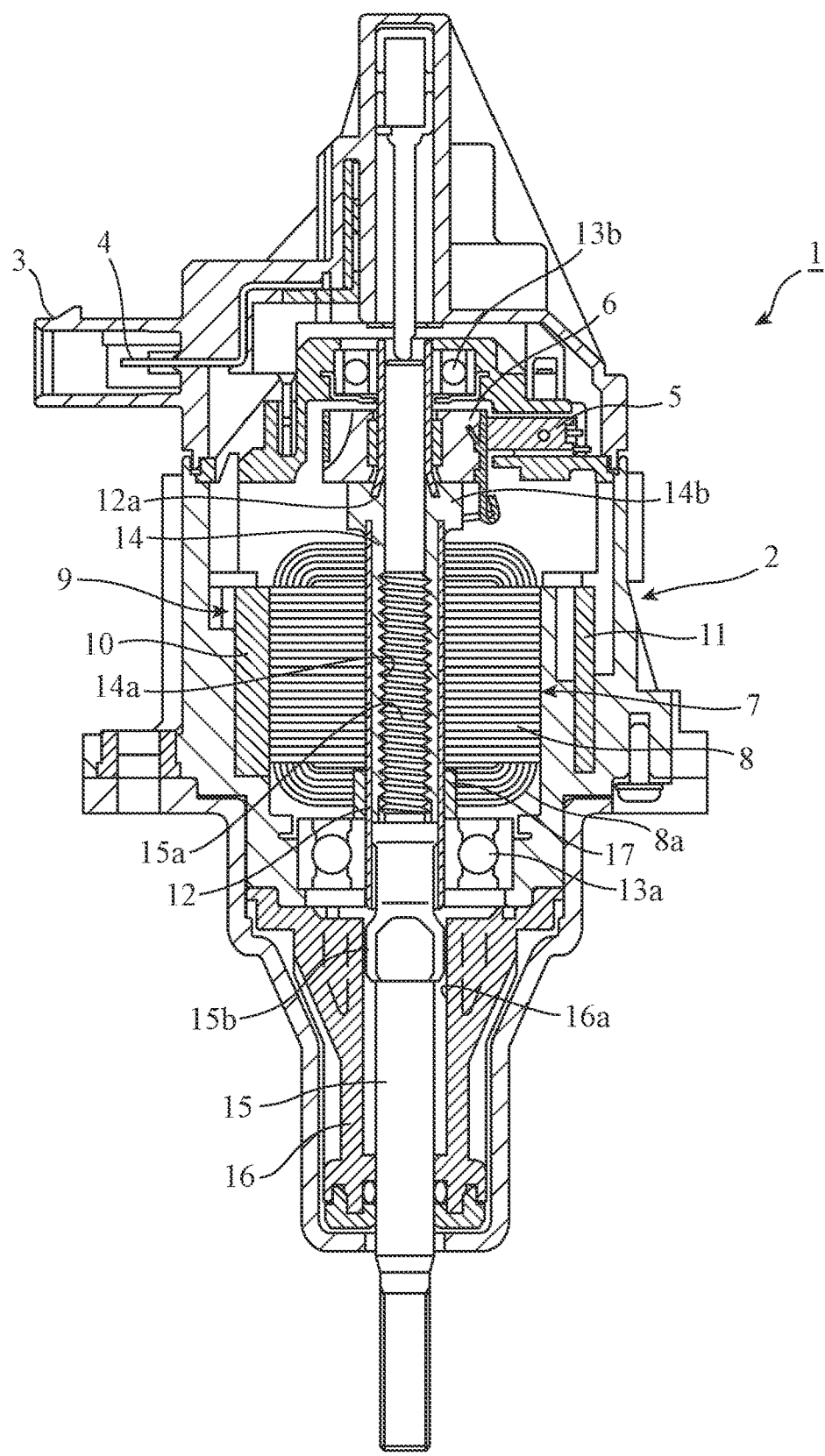
FIG. 1 is a cross-sectional view of an actuator including a DC motor according to Embodiment 1 of the present invention.

FIG. 1 is a cross-sectional view of an actuator 1 including a DC motor 2 according to Embodiment 1 of the present invention, the actuator 1 being cut in the axial direction.

A voltage is applied to a terminal 4 of an external input connector 3 in the actuator 1, which causes currents to pass through electromagnetic coils 8a in a rotor 7 via a brush 5 and a commutator 6. A rotor core 8 in the rotor 7 is thereby magnetized into several north poles and south poles. The rotor 7 is rotated by magnetic attractions of magnets 10, each being magnetized into a north pole and a south pole, of a stator 9. The stator 9 includes a stator core 11 disposed in the outer circumference of the magnets 10. The stator core 11 and the magnets 10 serve as a magnetic circuit.

The rotor 7 includes a rotor shaft 12 rotatably held by bearings 13a at the output side and by bearings 13b adjacent to the commutator 6. A cylindrical member 14 formed by a resin material is provided inside the rotor shaft 12. The cylindrical member 14 has an internal thread 14a on its inner periphery. The internal thread 14a engages with an external thread 15a of an output shaft 15, as illustrated in FIG. 1.

The output shaft 15 has a flat rotation stopper 15b on its outer periphery in the circumferential direction partly. The output shaft 15 is provided into a boss 16, which also has a flat rotation stopper 16a on part of its inner periphery. The rotation stopper 15b and the rotation stopper 16a face each other, which prevents the rotation of the output shaft 15 by torque of the rotor 7.

In this manner, the output shaft 15 does not rotate, and the torque of the rotor 7 is converted into thrust of the output shaft in its linear motion direction. The output shaft 15 thereby moves linearly.

A collar 14b is an annular member provided on the outer periphery of the rotor shaft 12.

As illustrated in FIG. 1, plural apertures 12a are provided for part of the rotor shaft 12 extending between the rotor core 8 and the commutator 6. The apertures 12a penetrating the outer wall of this part of the rotor shaft 12.

The collar 14b is integrated with the cylindrical member 14 formed by a resin material through the apertures 12a. In other words, the collar 14b is an insulating member formed by the same resin material as that of the cylindrical member 14 and thus prevents the windings of the electromagnetic coils 8a from coming into contact with the rotor shaft 12 in a space between the rotor core 8 and the commutator 6.

A bush 17 is an annular insulating member. After the rotor shaft 12 is combined with the rotor core 8, part of the rotor shaft 12 extending between the rotor core 8 and the bearings 13a at the output side is provided into the bush 17. Thus, the bush 17 prevents the windings of the electromagnetic coils 8a from coming into contact with the rotor shaft 12 in a space between the rotor core 8 and the bearings 13a.

Figure 2A:
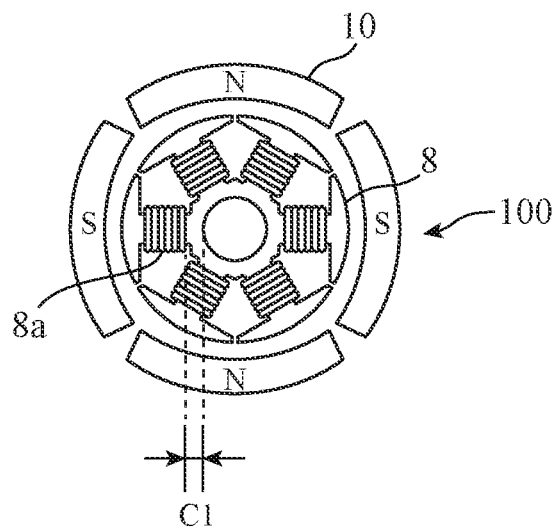
FIG. 2A is a schematic view of a rotor including electromagnetic coils formed around a rotor core by concentrated winding.
Figure 2B:
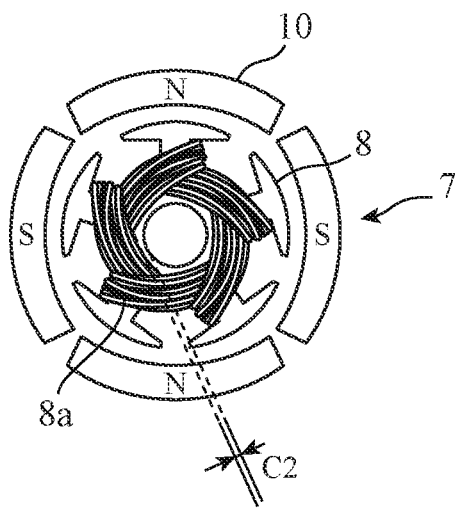
FIG. 2B is a schematic view of a rotor including electromagnetic coils formed around a rotor core by distributed winding.
Figure 3:
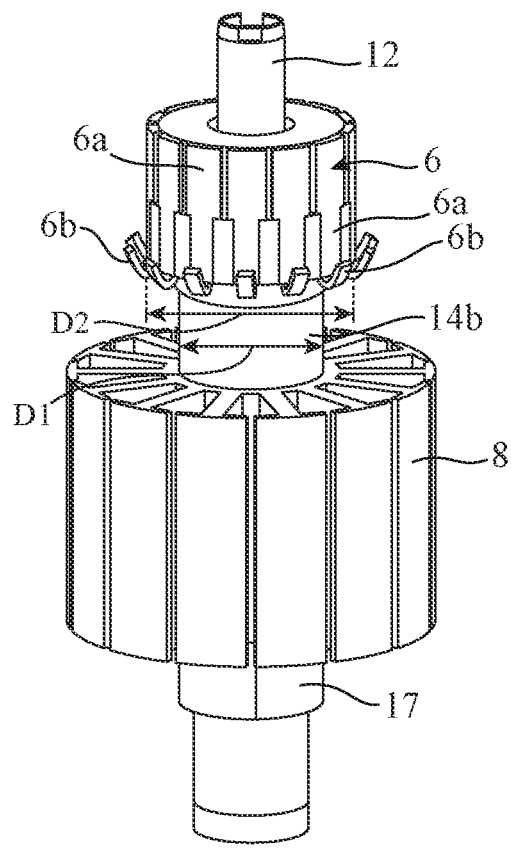
FIG. 3 is a perspective view of a rotor in the DC motor according to Embodiment 1.
Figure 4:
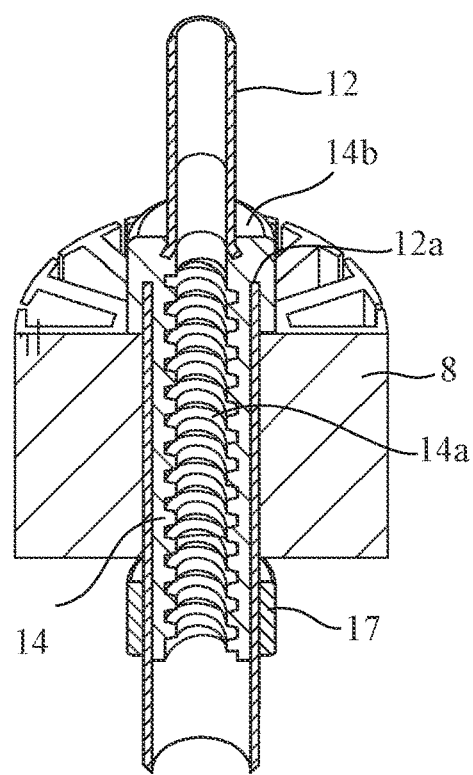
FIG. 4 is a cross-sectional view of the rotor, cut in the axial direction, of FIG. 3.

FIG. 2A is a schematic view of a rotor 100 including electromagnetic coils 8a formed around the rotor core 8 by concentrated winding. FIG. 2B is a schematic view of the rotor 7 including electromagnetic coils 8a formed around the rotor core 8 by distributed winding. FIG. 3 is a perspective view of the rotor 7 in the DC motor 2. FIG. 4 is a cross-sectional view of the rotor 7, cut in the axial direction, of FIG. 3, where the commutator 6 is not illustrated.

Winding techniques for the electromagnetic coils 8a in a brushed DC motor include a concentrated-winding scheme and a distributed-winding scheme.

In the concentrated-winding scheme, a wire is concentratedly wound around each of the teeth of the rotor core 8, as illustrated in FIG. 2A. Thus, the coil ends of the electromagnetic coils 8a do not largely protrude from the end face of the rotor core 8 in the axial direction, and the length of the rotor 100 in the axial direction can be reduced. As a result, the size of the DC motor can be decreased.

Unfortunately, in the case that the electromagnetic coils 8a are formed around the rotor core 8 by concentrated winding, large amounts of noise are generated between the brush 5 and the commutator 6. Thus, a snubber circuit for elimination of the noise is required.

Automobile actuators may be used at a high temperature, for example, about 160° C. In such a temperature environment, electronic components in the snubber circuit, such as capacitors and resistors, or a board on which such components are mounted cannot endure the temperature, and the snubber circuit may be inoperable.

In the distributed-winding scheme, a wire is wound extending over several teeth as illustrated in FIG. 2B. Thus, the coil ends largely protrude from the end face of the rotor core 8 in the axial direction, and the length of the rotor 100 in the axial direction cannot be reduced.

However, in the case that the electromagnetic coils 8a are formed around the rotor core 8 by distributed winding, unlike the concentrated-winding scheme, large amounts of noise are not generated between the brush 5 and the commutator 6. Thus, no snubber circuit is required.

The DC motor 2 according to Embodiment 1 is intended for use also at high temperature. The electromagnetic coils 8a are thus formed around the rotor core 8 by distributed winding.

Unfortunately, in the distributed-winding scheme, the wire is wound extending over several teeth and gradually comes close to the rotor shaft 12.

Thus, a distance C2 from the end of each of the electromagnetic coils 8a formed by distributed winding near the rotor shaft 12 to the rotor shaft 12 is shorter than a distance C1 from the end of each of the electromagnetic coils 8a formed by concentrated winding near the rotor shaft 12 to the rotor shaft 12.

As illustrated in FIG. 3, the commutator 6 is fixed to the rotor shaft 12 at one end of the rotor core 8 in the axial direction of the rotor core 8 and rotates with the rotor shaft 12. The commutator 6 includes plural segments 6a disposed in the circumferential direction at equal intervals. The segments 6a are insulated from each other and are each provided with a hook 6b. The winding (crossing winding) of the electromagnetic coil 8a corresponding to each segment 6a is connected to the corresponding hook 6b and then fused, for example, through resistance welding. The hooks 6b and the windings of the electromagnetic coils 8a are thereby connected and fixed.

As described above, in the distributed-winding scheme, the windings of the electromagnetic coils 8a are close to the rotor shaft 12 and may readily come into contact with the rotor shaft 12.

In other words, in the rotor 7 including the electromagnetic coils 8a formed by distributed winding, the windings connected to different segments 6a may come into contact with the rotor shaft 12, which can readily cause the segments of the commutator 6 to be short-circuited via the rotor shaft 12.

Thus, the DC motor 2 according to Embodiment 1 includes the insulating collar 14b which is provided for part of the rotor shaft 12 on the opposite side to the output side of the rotor core 8.

The part is part of the rotor shaft 12 extending between the rotor core 8 and the commutator 6, when the commutator 6 is disposed on the opposite side to the output side of the rotor core 8. Thus, the collar 14b intervenes between the outer periphery of the rotor shaft 12 and the windings of the electromagnetic coils 8a toward the commutator 6, which properly insulates the windings of the electromagnetic coils 8a from the rotor shaft 12.

If the collar 14b is not provided and the rotor shaft 12 is covered with a heat-shrinkable tube, a wire forming the electromagnetic coil 8a is wound around the heat-shrinkable tube and is then connected to the corresponding hook 6b.

In the rotor shaft 12, the diameter of the portion covered with the heat-shrinkable tube is substantially the same as that of the rotor shaft 12 itself. Thus, the difference is large between the diameter of the portion covered with the heat-shrinkable tube and the diameter of a circle in which hooks 6b of commutator 6 are arranged. Thus, the tension of the wire fluctuates, generating stress in the electromagnetic coils 8a. The stress may cause shapeless or loosened windings of electromagnetic coils 8a.

In the rotor shaft 12, the diameter of the portion covered with the heat-shrinkable tube is substantially the same as that of the rotor shaft 12 itself. Thus, the coil end, the difference is large between the diameter of the portion covered with the heat-shrinkable tube and the diameter of a circle in which hooks 6b of commutator 6 are arranged. Thus, the tension of the wire fluctuates, generating stress in the electromagnetic coils 8a. The stress may cause shapeless or loosened windings of electromagnetic coils 8a.

In contrast, the collar 14b reduces the difference (D2−D1) between a diameter D1 including the collar 14b and a diameter D2 of a circle in which the hooks 6b are arranged as illustrated in FIG. 3.

In the case that the wire extending from the coil end is wound around the collar 14b and is thereafter connected to the corresponding hook 6b, the tension of the wire less fluctuates. Thus, the stress in the electromagnetic coils 8a can be reduced.

As illustrated in FIG. 4, the annular collar 14b is integrated with the cylindrical member 14 through the plural apertures 12a. Thus, when the torque of the rotor 7 is transmitted to the output shaft 15, the connection between the cylindrical member 14 and the collar 14b through the apertures 12a serves as a rotation stopper preventing the cylindrical member 14 from rotating inside the rotor shaft 12.

Figure 5A:
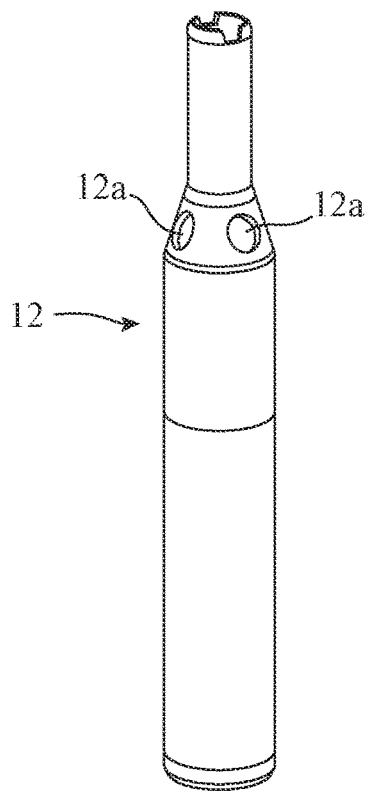
FIG. 5A is a perspective view of a rotor shaft in the DC motor according to Embodiment 1.
Figure 5B:
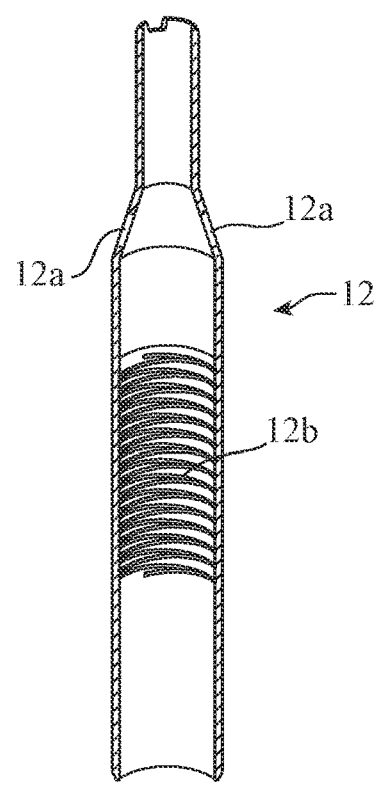
FIG. 5B is a cross-sectional view of the rotor shaft, cut in the axial direction, of FIG. 5A.

FIG. 5A is a perspective view of the rotor shaft 12 in the DC motor 2. FIG. 5B is a cross-sectional view of the rotor shaft 12, cut in the axial direction, of FIG. 5A. As illustrated in FIGS. 5A and 5B, the rotor shaft 12 has a hollow cylindrical shape.

As illustrated in FIG. 5A, the apertures 12a are provided for part of the rotor shaft 12 which is positioned between the rotor core 8 and the commutator 6. Furthermore, the rotor shaft 12 has undulations 12b on its inner periphery as illustrated in FIG. 5B. When the cylindrical member 14 is formed by injection of a resin material into the rotor shaft 12, the outer periphery of the cylindrical member 14 is formed engaging with the undulations 12b. This prevents the cylindrical member 14 from dropping out of the rotor shaft 12.

Figure 6:
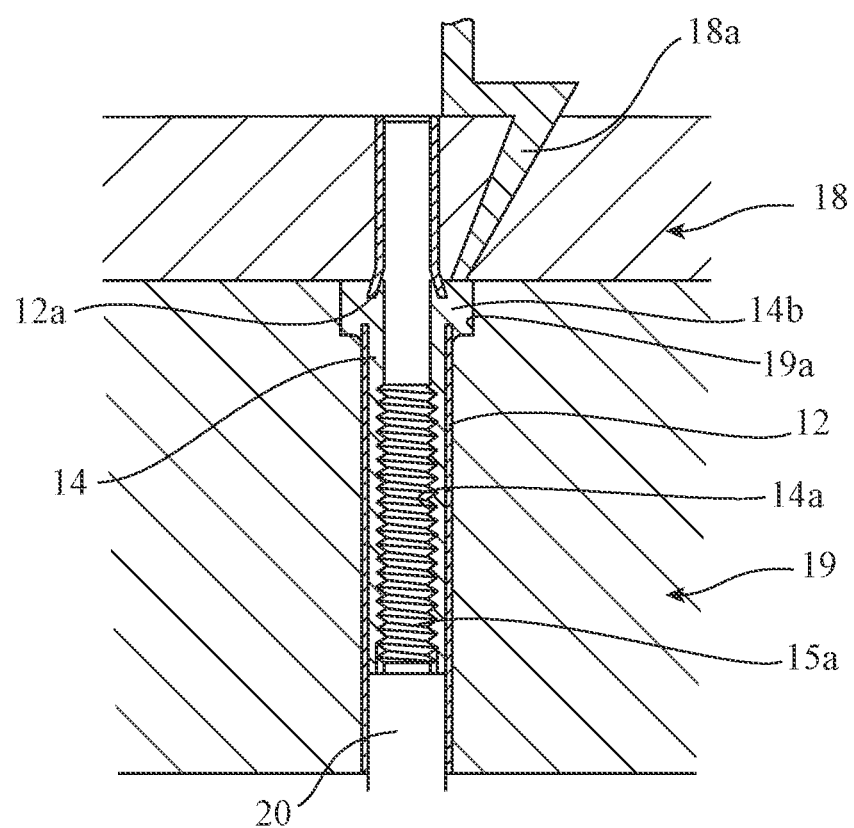
FIG. 6 illustrates part of manufacturing processes of the rotor shaft in the DC motor according to Embodiment 1.

FIG. 6 illustrates part of the manufacturing process of the rotor shaft 12 in the DC motor 2, and shows the rotor shaft 12 and molds 18 and 19 that are cut in the axial direction of the rotor shaft 12, along with a mold 20 which is not cut. The rotor shaft 12 is supported between the mold 18 and the mold 19 with the mold 20 inserted into the rotor shaft 12. In the mold 19, the portion around the apertures 12a defines a space 19a for formation of the collar. The mold 20 is a bar having an external thread 15a on its outer periphery.

A resin material is injected from a gate 18a in communication with the space 19a, fills the space 19a, and further flows between the inner periphery of the rotor shaft 12 and the outer periphery of the mold 20 via the apertures 12a. The cylindrical member 14 having the internal thread 14a and the collar 14b are thereby formed.

After the resin material sufficiently solidifies, the mold 20 is removed, and the mold 18 is separated from the mold 19. The rotor shaft 12 having the cylindrical member 14 and the collar 14b is thereby unmolded.

In this manner, in the DC motor 2 according to Embodiment 1, the collar 14b is formed in the process for formation of the internal thread 14a.

The rotor shaft 12 having the cylindrical member 14 and the collar 14b is then press fitted into the central hole of the rotor core 8 and combined therewith, by first inserting the end of the rotor shaft 12 on the output side into the central hole of the rotor core 8.

Thereafter, as illustrated in FIG. 4, part of the rotor shaft 12 extending between the rotor core 8 and the bearings 13a is provided into the bush 17.

As described above, in the actuator 1 according to Embodiment 1, the collar 14b in the DC motor 2 is provided on the outer periphery of the rotor shaft 12 and is integrated with the cylindrical member 14 through the apertures 12a penetrating the outer wall of the rotor shaft 12.

With such a configuration, in the process for formation of the cylindrical member 14 inside the rotor shaft 12 the collar 14b is formed integrally. Thus, manufacturing under simple process management and with simple work is achieved.

The collar 14b formed by a resin material intervenes between the outer periphery of the rotor shaft 12 and the windings of the electromagnetic coils 8a. Thus, the collar 14b can properly insulate the windings of the electromagnetic coils 8a from the rotor shaft 12.

Furthermore, the connection between the cylindrical member 14 and the collar 14b through the apertures 12a serves as a rotation stopper preventing the cylindrical member 14 from rotating inside the rotor shaft 12.

In the DC motor 2 according to Embodiment 1, the collar 14b is provided for part of the rotor shaft 12 on the opposite side to the output side of the rotor core 8. This can properly insulate the windings of the electromagnetic coils 8a from the rotor shaft 12, for example, in a space between the rotor core 8 and the commutator 6. The collar 14b can reduce the difference between the diameter of the rotor shaft 12 including collar 14b and the diameter of a circle in which the hooks 6b are arranged. Thus, the stress generated in the electromagnetic coils 8a can be reduced compared to conventional techniques.

Embodiment 2

Figure 7:
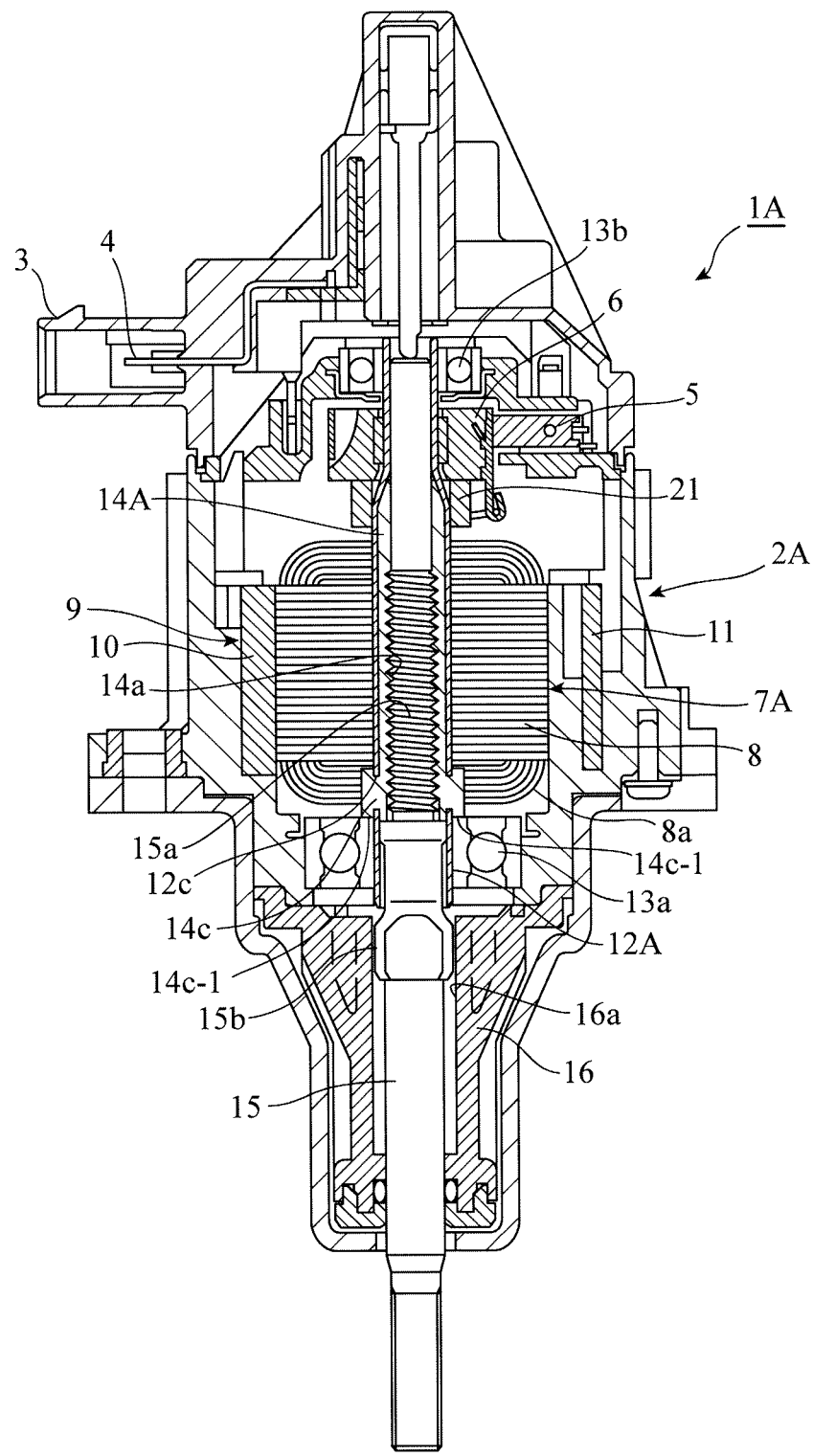
FIG. 7 is a cross-sectional view of an actuator including a DC motor according to Embodiment 2 of the present invention.

FIG. 7 is a cross-sectional view of an actuator 1A including a DC motor 2A according to Embodiment 2 of the present invention, the actuator 1A being cut in the axial direction.

A rotor shaft 12A in the DC motor 2A is provided with apertures 12c and a collar 14c instead of the apertures 12a and the collar 14b illustrated in Embodiment 1.

Similar to Embodiment 1, in the DC motor 2A, the electromagnetic coils 8a are formed around the rotor core 8 by distributed winding.

In FIG. 7, the same components as those in FIG. 1 are denoted by the same reference numerals without redundant description.

As illustrated in FIG. 7, the apertures 12c penetrating the outer wall of part of the rotor shaft 12A extending between the rotor core 8 and the bearings 13a.

The collar 14c is integrated with a cylindrical member 14A formed by a resin material through the apertures 12c. In other words, the collar 14c is an insulating member formed by the same resin material as that of the cylindrical member 14A and thus prevents the windings of the electromagnetic coils 8a from coming into contact with the rotor shaft 12A in a space between the rotor core 8 and the bearings 13a.

The end face of the collar 14c adjacent to the bearings 13a serve as positioning face 14c-1. When the bearings 13a are fit in a rotor 7A, inner ring in the bearings 13a are in contact with the positioning face 14c-1 and the collar 14c sits on t. Positions of the rotor shaft 12A and the bearings 13a in the axial direction are thereby determined.

A bush 21 is an annular insulating member. After the rotor shaft 12A is combined with the rotor core 8, part of the rotor shaft 12A extending between the rotor core 8 and the commutator 6 is provided into the bush 21. In other words, the bush 21 prevents the windings of the electromagnetic coils 8a from coming into contact with the rotor shaft 12A in a space between the rotor core 8 and the commutator 6.

Figure 8:
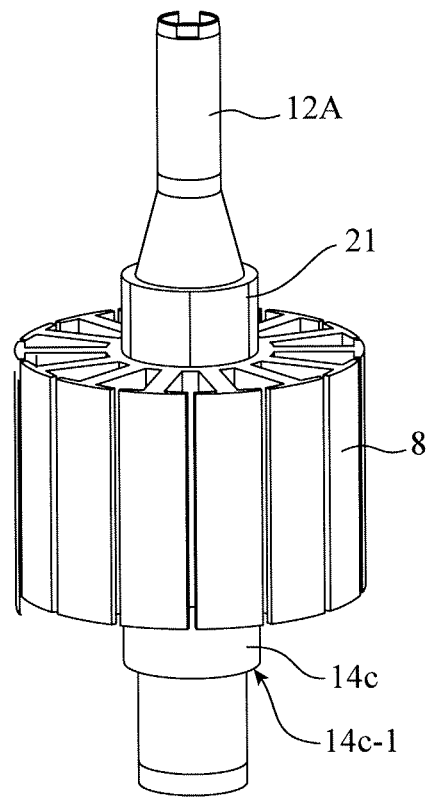
FIG. 8 is a perspective view of a rotor in the DC motor according to Embodiment 2.
Figure 9:
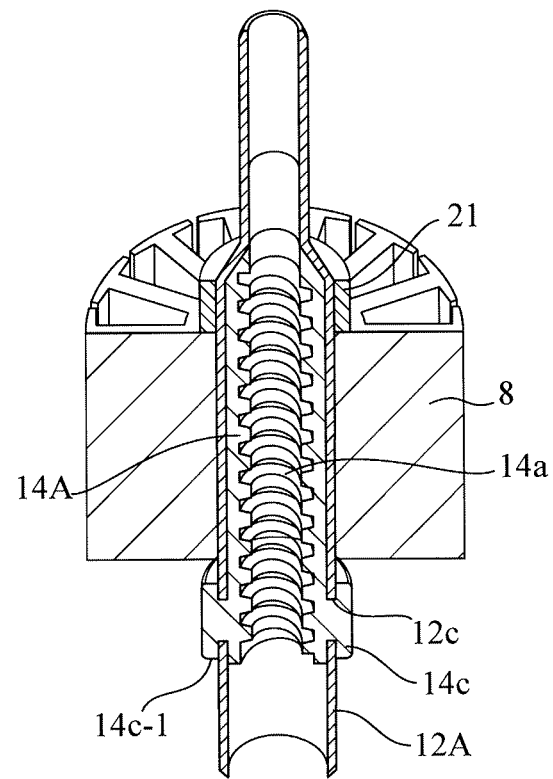
FIG. 9 is a cross-sectional view of the rotor, cut in the axial direction, of FIG. 8.

FIG. 8 is a perspective view of the rotor 7A in the DC motor 2A. FIG. 9 is a cross-sectional view of the rotor 7A, cut in the axial direction, of FIG. 8 without illustration of the commutator 6.

As described in Embodiment 1, in the distributed-winding scheme, the windings largely protrude from the end face of the rotor core 8 in the axial direction and reside adjacent to the rotor shaft 12A at the coil ends. This also holds at the coil ends adjacent to the bearings 13a.

In the DC motor 2A according to Embodiment 2, the insulating collar 14c is provided for part of the rotor shaft 12A on the output side of the rotor core 8.

Thus, the collar 14c intervenes between the outer periphery of the rotor shaft 12A and the windings at the coil ends of the electromagnetic coils 8a, which can properly insulates the windings of the electromagnetic coils 8a from the rotor shaft 12A.

As illustrated in FIG. 9, the collar 14c is integrated with the cylindrical member 14A through the apertures 12c. Thus, when the torque of the rotor 7A is transmitted to the output shaft 15, the connection between the cylindrical member 14A and the collar 14c through the apertures 12c serves as a rotation stopper preventing the cylindrical member 14A from rotating inside the rotor shaft 12A.

Figure 10:
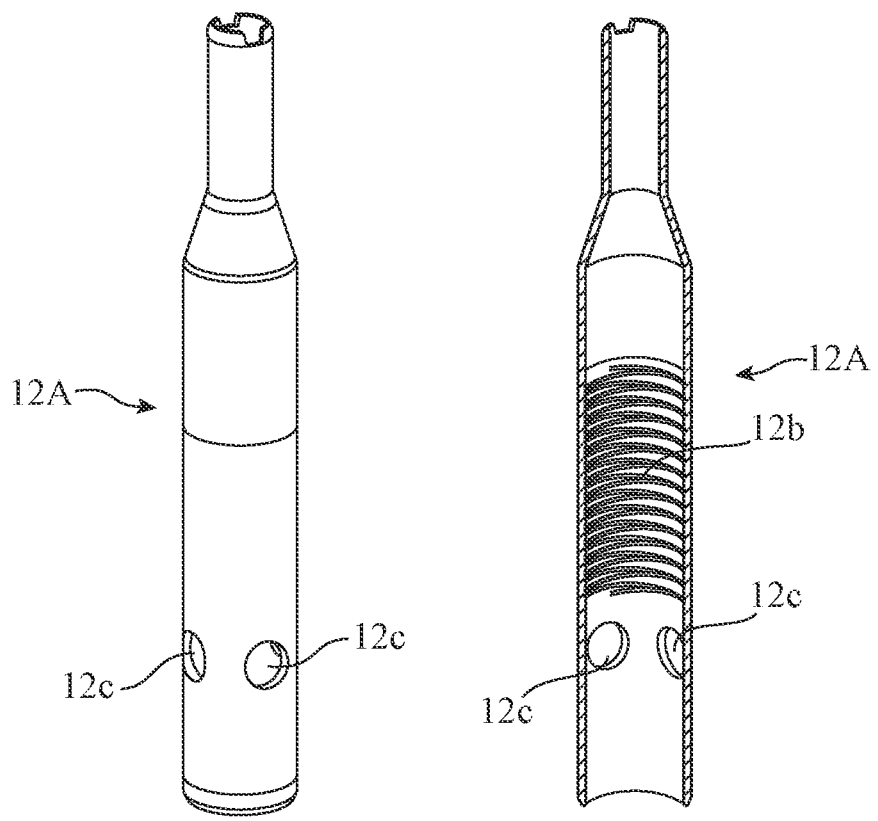
FIG. 10A is a perspective view of a rotor shaft in the DC motor according to Embodiment 2.
FIG. 10B is a cross-sectional view of the rotor shaft, cut in the axial direction, of FIG. 10A.

FIG. 10A is a perspective view of the rotor shaft 12A in the DC motor 2A. FIG. 10B is a cross-sectional view of the rotor shaft 12A, cut in the axial direction, of FIG. 10A. As illustrated in FIGS. 10A and 10B, the rotor shaft 12A has a hollow cylindrical shape.

As illustrated in FIG. 10A, the apertures 12c are provided for part of the rotor shaft 12A which is positioned between the rotor core 8 and the bearings 13a.

As illustrated in FIG. 10B, the rotor shaft 12A has the undulations 12b on its inner periphery. When the cylindrical member 14A is formed by injection of a resin material into the rotor shaft 12A, the outer periphery of the cylindrical member 14A is formed engaging with the undulations 12b. This prevents the cylindrical member 14A from dropping out of the rotor shaft 12A.

The rotor shaft 12A having the cylindrical member 14A and the collar 14c is then press fitted into the central hole of the rotor core 8 and combined therewith, by first inserting the end of the rotor shaft 12A where the commutator 6 is to be provided into the central hole of the rotor core 8.

Thereafter, part of the rotor shaft 12A extending between the rotor core 8 and the commutator 6 is provided into the bush 21.

In the DC motor 2A according to Embodiment 2, the collar 14c is provided for part of the rotor shaft 12A on the output side of the rotor core 8e, as described above.

Such a configuration allows the windings of the electromagnetic coils 8a to be properly insulated from the rotor shaft 12A, for example, in a space between the rotor core 8 and the bearings 13a at the output side.

The end face of the collar 14c adjacent to the bearings 13a serves as the positioning face 14c-1 that can precisely determine positions of the rotor shaft 12A and the bearings 13a in the axial direction.

Embodiment 3

Figure 11:
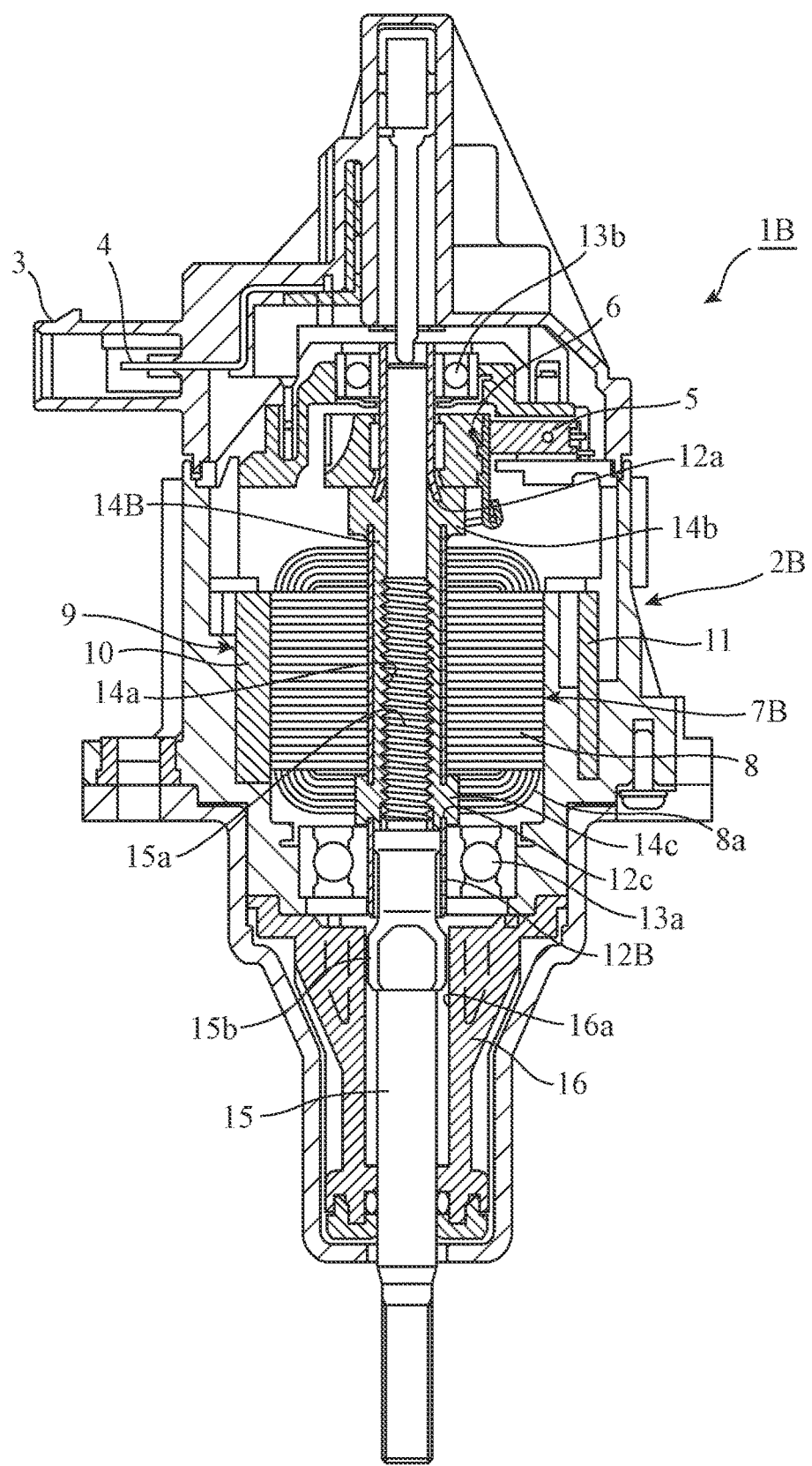
FIG. 11 is a cross-sectional view of an actuator including a DC motor according to Embodiment 3 of the present invention.

FIG. 11 is a cross-sectional view of an actuator 1B including a DC motor 2B according to Embodiment 3 of the present invention, the actuator 1B being cut in the axial direction.

The DC motor 2B includes a rotor shaft 12B provided with the apertures 12a and the collar 14b according to Embodiment 1 and the apertures 12*c* and the collar 14*c* according to Embodiment 2. Similar to Embodiment 1, in a rotor 7B of the DC motor 2B, the electromagnetic coils 8*a* are formed around the rotor core 8 by distributed winding.

In FIG. 11, the same components as those in FIGS. 1 and 7 are denoted by the same reference numerals without redundant description.

Figure 12:
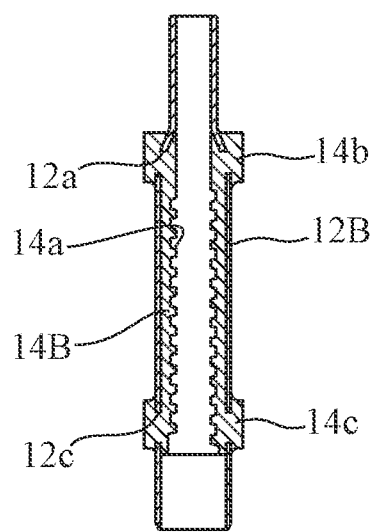
FIG. 12 is a cross-sectional view of a rotor shaft, cut in the axial direction, in the DC motor according to Embodiment 3.

FIG. 12 is a cross-sectional view of the rotor shaft 12B, cut in the axial direction, of the DC motor 2B. Similar to Embodiments 1 and 2, a cylindrical member 14B illustrated in FIG. 12 is formed by injection of a resin material into the rotor shaft 12B. The cylindrical member 14B has the internal thread 14*a* on its inner periphery.

The collar 14*b* is integrated with the cylindrical member 14B through the apertures 12*a*. The collar 14*c* is integrated with the cylindrical member 14B through the apertures 12*c*.

In other words, the collars 14*b* and 14*c* are annular insulating members formed by the same resin material as that of the cylindrical member 14B.

The collar 14*b* is provided for part of the rotor shaft 12B on the opposite side to the output side of the rotor core 8 and insulates the windings of the electromagnetic coils 8*a* from the rotor shaft 12B, for example, in a space between the rotor core 8 and the commutator 6. The collar 14*c* is provided for part of the rotor shaft 12B on the output side of the rotor core 8 and insulates the windings of the electromagnetic coils 8*a* from the rotor shaft 12B, for example, in a space between the rotor core 8 and the bearings 13*a*.

The bush 17 according to Embodiment 1 and the bush 21 according to Embodiment 2 can be thereby omitted.

It should be noted that the rotor shaft 12B provided with the collar 14*b* and the collar 14*c* cannot be combined with the rotor core 8. Thus, in the case that the collar 14*b* and the collar 14*c* are formed by a resin material on the rotor shaft 12B together, molds are required to form the collars 14*b* and 14*c* on a structure including the combined rotor shaft 12B and rotor core 8.

As described above, in the DC motor 2B according to Embodiment 3, the collar 14*b* is provided for part of the rotor shaft 12B on the opposite side to the output side of the rotor core 8. The collar 14*c* is provided for part of the rotor shaft 12B on the output side of the rotor core 8.

Such a configuration allows the collars 14*b* and 14*c* to properly insulate the windings of the electromagnetic coils 8*a* from the rotor shaft 12B. Since no bush is required, the number of the components can be reduced.

It should be noted that the present invention can include any combination of the embodiments, or modifications or omission of any component in the embodiments within the scope of the invention.

INDUSTRIAL APPLICABILITY

The DC motor according to the present invention can be manufactured under simple process management and with simple work and can properly insulate windings of electromagnetic coils from a rotor shaft. Thus the DC motor according to the present invention is suitable for, for example, actuators for exhaust gas recirculation valves in automobiles.

REFERENCE SIGNS LIST

1, 1A, 1B ACTUATOR
2, 2A, 2B DC MOTOR
3 EXTERNAL INPUT CONNECTOR
4 TERMINAL
5 BRUSH
6 COMMUTATOR
6*a* SEGMENT
6*b* HOOK
7, 7A, 7B, 100 ROTOR
8 ROTOR CORE
8*a* ELECTROMAGNETIC COIL
9 STATOR
10 MAGNETS
11 STATOR CORE
12, 12A, 12B ROTOR SHAFT
12*a*, 12*c* APERTURES
12*b* UNDULATIONS
13*a*, 13*b* BEARINGS
14, 14A, 14B CYLINDRICAL MEMBER
14*a* INTERNAL THREAD
14*b*, 14*c* COLLAR
14*c*-1 POSITIONING FACE
15 OUTPUT SHAFT
15*a* EXTERNAL THREAD
15*b*, 16*a* ROTATION STOPPER
16 BOSS
17, 21 Bush
18, 19, 20 MOLD
18*a* GATE
19*a* SPACE

The invention claimed is:

1. A direct-current motor comprising:
   a rotor including: a rotor core which is provided with electromagnetic coils formed around the rotor core by distributed winding, and a cylindrical rotor shaft combined with the rotor core;
   a thread provided on an inner periphery of a cylindrical member which is formed by a resin material inside the rotor shaft, and to convert torque of the rotor into thrust of an output shaft in a linear motion direction of the output shaft and
   at least one annular collar provided on an outer periphery of the rotor shaft, the collar being integrated with the cylindrical member through an aperture penetrating an outer wall of the rotor shaft, wherein the collar is provided for part of the rotor shaft on an output side of the rotor core.

2. An actuator comprising:
   the direct-current motor according to claim 1; and
   the output shaft.

3. A direct-current motor comprising:
   a rotor including: a rotor core which is provided with electromagnetic coils formed around the rotor core by distributed winding, and a cylindrical rotor shaft combined with the rotor core;
   a thread provided on an inner periphery of a cylindrical member which is formed by a resin material inside the rotor shaft, and to convert torque of the rotor into thrust of an output shaft in a linear motion direction of the output shaft and
   at least one annular collar provided on an outer periphery of the rotor shaft, the collar being integrated with the cylindrical member through an aperture penetrating an outer wall of the rotor shaft, wherein the at least one collar includes:
   a collar provided for part of the rotor shaft on an opposite side to an output side of the rotor core; and
   a collar provided for part of the rotor shaft on the output side of the rotor core.

4. An actuator comprising:
the direct-current motor according to claim 3; and
the output shaft.

* * * * *